Patented Apr. 24, 1934

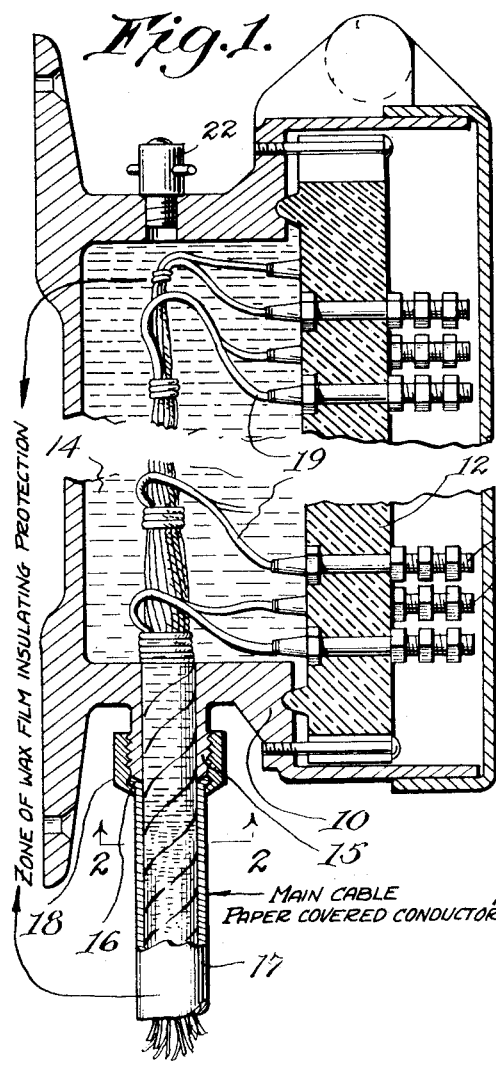
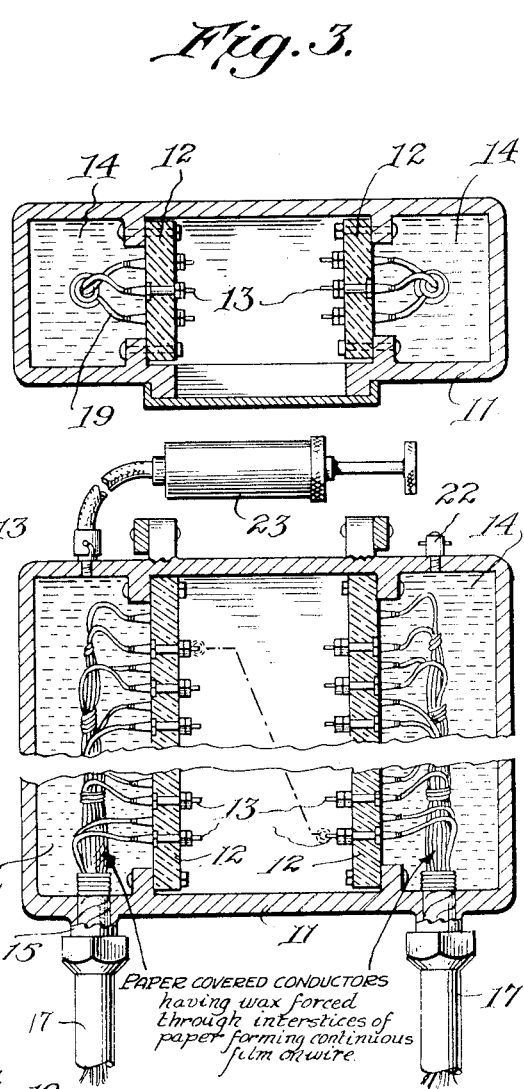
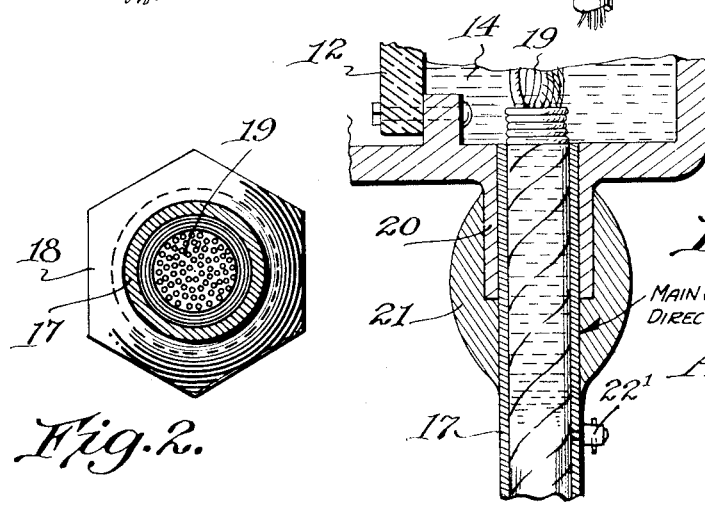

1,956,534

UNITED STATES PATENT OFFICE 1,956,534

SEALED TERMINAL FOR INSULATED CABLES

Adolph Z. Mample, Glen Rock, N. J., assignor to The Western Union Telegraph Company, New York, N. Y., a corporation of New York Application October 23, 1929, Serial No. 401,825

4 Claims. (Cl. 247—7)

This invention relates to the sealing of the terminals of paper insulated cables and particularly to the insulation of such terminals to prevent moisture from gaining access to the interior of the cable or otherwise breaking down the insulation of the covering or wrapping on the wires in the cable.

The cables in most common use at the present time for communication systems are of the type known as lead sheath paper insulated cables which are very susceptible to moisture. Consequently, in the outdoor plant such cables are almost always terminated in weather proof chambers or distributing boxes. It has been the practice heretofore to splice a short section of pothead cable having rubber covered conductors to the paper insulated conductors of the cable, the connection being protected with a wiped joint; or a pothead may be employed which is sealed with pothead compound. The rubber covered wires were then lead into the distributing box or terminal chamber.

The terminal box or chamber is sometimes fitted with a short length of pothead cable at the factory, the rubber covered wires being connected to the terminal clips or binding posts and the chamber being then filled with a sealing compound. The short length of cable projecting from the box is then connected to the paper insulated conductors of the cable terminal and united by a wiped joint. The compounds at present used require a high degree of heat to render them fluid and are poured into the box or chamber at high temperature frequently as high or higher than 350° F., so that they will flow freely and fill the crevices. These cable terminal boxes and sealed chambers, however, eventually become defective and permit moisture to penetrate and condensation takes place. This, of course, causes deterioration of the insulation of the cable when it reaches the paper insulated conductors.

I have found that the compound shrinks as it cools, having small interstices between the inner walls of the box or chamber and the compound filling. This is increased by the expansion and contraction of the box and also by difference in expansion between the iron box or walls of the chamber and the cover or partitions when the latter are of porcelain or other suitable insulating material.

Aside from the defects above mentioned, the proper connection of the rubber insulated terminal wires to the ends of the paper insulated cable conductors and the wiped joint connections consume a large amount of time and increase very materially the cost of installation.

In cables for electric light and power systems the conductors are covered with rubber insulation and hence moisture does not penetrate or reduce the insulation of the conductors. In communication cables, on the other hand, the conductors are provided with a paper covering and the insulation is mainly due to the air in the minute interstices between the paper insulation and the air cells of the fibrous covering which must be maintained absolutely dry. The presence of any moisture immediately reduces the insulating properties of the paper envelope and soon causes a breakdown of the cable.

Junction boxes employed to connect electric light and power cables have been filled with insulating compound under pressure in order to fill all cavities in the boxes and render them watertight, but in all such prior uses the conductors were covered with a rubber composition which is itself an effective insulation. The purpose of my invention is to provide an effective seal against moisture and a complete insulation for the terminals of cables in which the envelope or covering of the conductors is merely a paper fabric which is an insulator only so long as it is absolutely dry. As stated above, the conductors of electric light and power systems are covered with an impervious covering of a rubber compound and hence the problem of protecting the insulation does not arise. An entirely new condition presents itself in the use of communication cables in which the paper insulation of the conductors readily absorbs moisture which destroys the insulating properties.

Prior to my invention it was thought to be sufficient to fill the terminal boxes with an insulating compound, but nevertheless the insulation of the cables frequently broke down. I have discovered that the trouble usually occurs in the cable at a point below the connection with the terminal box where it is not protected by the insulating compound in the box. I have been able to overcome this difficulty and to ensure the integrity of the insulation of the cable by placing the insulating compound under pressure not only until the interstices between conductors are completely filled but further causing the compound to penetrate the cellular structure of the paper fibre until it actually reaches and encases the metal conductors. The pressure is maintained until this penetration has extended to a considerable distance within the cable below the terminal box. The terminal of the cable is thus completely sealed against the penetration of any moisture and a breakdown from this cause is effectually prevented.

My invention, therefore, provides means for effectively sealing the terminals of cables having paper insulated conductors and rendering them moisture proof; completely seals the terminal distributor box or chamber; permits the paper insulated conductors of the cable to be led directly into the terminal box or chamber, thereby dispensing with the necessity for field splices and rubber covered pothead cables; avoids shrinkage of the sealing compound in the terminal box or chamber; and renders the terminal end of the cable gas tight, thereby eliminating the necessity for inserting a dam at each terminal or branch outlet when subjecting the cable to gas pressure for the purpose of testing the integrity of the lead sheath.

In the following description I shall refer to the accompanying drawing, in which—

Figure 1 is a vertical section, partly in elevation, through a terminal box and a cable end, illustrating the connection between the two and the insulating filler or sealing compound.

Figure 2 is an enlarged detail section on the line 2—2 of Figure 1.

Figure 3 is a horizontal section through a distributing box or cable terminal sealed chamber constructed in accordance with this invention.

Figure 4 is a vertical section through the type of box or chamber shown in Figure 3.

Figure 5 is an enlarged detail showing a modified form of joint between the box and cable.

In Figure 1 I have shown a terminal box 10 of a type which may be used at the end of a cable and in Figures 3 and 4 a box or sealed cable terminal chamber 11 of the type used between two cables where cross connecting facilities are required. In each of these cases there is provided within the box or chamber an insulating panel or panels 12, for the support of binding posts 13. This panel is spaced to provide a cable wire compartment 14 behind the panel and in the form shown in Figures 1 to 4, there extends downward from the bottom wall of the compartment a nipple 15 having its lower portion threaded and its extremity beveled to provide a seat for an outwardly flanged portion 16 of the cable sheath 17, a binding nut 18 being screwed on the nipple to clamp the flange 16 securely in position and thus connect the sheath of the cable with the box so that the interior paper insulated part of the cable may be led up through the nipple into the box and there have the wires fanned out as at 19 for connection to the rear ends of the binding posts 13.

In the form shown in Figure 5, a nipple 20 is provided in place of the nipple 15 of such size that the cable sheath may extend therein, the joint being completed by wiping the joint in the manner usual with wiped lead pipe joints as indicated at 21. In the top of each box there is fitted a downwardly opening check valve 22 constructed for connection with a pressure gun 23 which may be of any preferred type, as for instance the type used in forced lubrication of automobiles and the like. By means of this pressure gun there is forced into the space behind the panel 12 a sealing compound of comparatively low melting point, say from 70° to 120° F. This compound may be of semi-solid wax and rosin oil and forms an efficient water proofing.

Now, this compound is forced by the gun 23 into the box under such pressure and at such a low temperature, substantially atmospheric, that not only does it fill all of the space in the box or chamber itself behind the panel 12, saturating the paper insulation of the wires but it is also forced down into the cable itself below the box as indicated in Figure 1, so that the entire end of the cable well below that part which has been stripped of its lead sheath for connection and distribution is sealed. As pointed out above sufficient pressure is exerted and for a period long enough to penetrate not only through every minute crevice of the paper wrappings but also throughout the cellular structure of the paper fabric itself until the conductor wires are completely encased by a waxy film of the insulating compound. Thus not only is moisture prevented from attacking the insulation of the wires in the box but such moisture cannot creep down and get into the inside of the lead sheath, since the sealing compound is applied after the connection of the cable to the box and if there are any cracks or crevices at any of the junction points the compound is forced by the gun pressure into these cracks or crevices. It will now be evident that there no longer exists the necessity of splicing rubber insulated wires to the ends of the cable conductors or of using a pothead but, on the contrary, the ordinary paper insulated wires may be led directly to the binding posts of the terminal box or chamber, the cable sheathing being of course stripped back in the usual manner for this purpose. It is to be particularly noted that such insulation of paper covered wires and the blocking off of the cable end from the entry of moisture can only be accomplished when proper pressure is applied to the sealing compound and the compound has a low melting point so that there is no shrinkage during solidification. In other words, by combining a compound which melts at a low temperature comparatively close to normal atmospheric temperatures with forced pressure I have overcome the defects which have rendered all prior methods of sealing cable terminals ineffectual against moisture.

Instead of filling the chamber 14 from the top as indicated in Figs. 1 and 4, I may inject the sealing compound through a check valve inserted through the lead sheath of the cable at a point below the attachment to the box or sealed chamber, as indicated at 22' in Fig. 5. In this case the sealing compound is forced up through the cable into the chamber until the whole has been effectually sealed. As pointed out in connection with the description of Fig. 1, the semiliquid compound is forced through the valve 22' under sufficient pressure to completely fill the terminal box, the pressure upon the compound being maintained for a period long enough to ensure the penetration of compound throughout the cellular structure of the paper covering of the individual conductors so that it forms a film encasing the conductors within the covering. It is impossible, therefore, for any moisture to penetrate within the cable. This method of sealing the ends of paper insulated cables may be employed whenever it is desired to prevent the entrance of moisture. The ends of cables may be treated in this manner before they are inserted in the terminal boxes.

I claim:

1. The method of sealing in situ the ends of lead sheath encased communication cables having a plurality of conductors insulated by fabric coverings pervious to moisture, which consists in injecting within the sheath an insulating compound under sufficient pressure and maintained until the compound has completely filled the interstices between the covered conductors and has penetrated through the cellular structure of said fabric coverings on the conductors, thereby encasing the metal conductors with a film of the compound beneath the coverings.

2. The method of sealing the ends of sheath encased communication cables provided with a plurality of pairs of conductors having fabric coverings pervious to moisture, such as paper, and connected to terminal distributing boxes, which includes the step of forcing a heated insulating compound under sufficient pressure to completely permeate the cellular structure of said fibrous conductor coverings and encase the metal conductors with a thin film of the compound in the portion of the cable adjacent a box from a position below the connection of the cable sheath with the box to the ends of the paper covered conductors within the box.

3. The method of sealing the ends of sheath encased communication cables provided with a plurality of conductors insulated by fabric coverings pervious to moisture, such as paper, and connected to terminal distributing boxes, which includes the steps of forcing heated insulating compound into the cable under sufficient pressure to completely permeate the interstices between and throughout the cellular structure of said fibrous conductor coverings and encase the conductors in the portion of the cable adjacent the terminal box and completely filling the box with said compound.

4. The combination with a sealed cable terminal box provided with an inlet opening, of a lead sheathed cable containing a plurality of paper insulated conductors, said lead sheath extending into said inlet opening and being secured by a connection exterior to the box, said paper insulated conductors being separated or fanned out within the box, and an insulating compound completely filling the box, said compound having been forced completely through the cellular structure of said paper insulation and forming a coating upon the conductors within the paper insulation thereon and to a distance along the conductors within the lead sheath below said exterior connection.

ADOLPH Z. MAMPLE.